United States Patent
Wakamiya

(10) Patent No.: US 11,235,735 B2
(45) Date of Patent: Feb. 1, 2022

(54) VEHICLE CONTROL APPARATUS

(71) Applicant: Toyota Jidosha Kabushiki Kaisha, Toyota (JP)

(72) Inventor: Hideyuki Wakamiya, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 16/732,633

(22) Filed: Jan. 2, 2020

(65) Prior Publication Data
US 2020/0231125 A1 Jul. 23, 2020

(30) Foreign Application Priority Data

Jan. 22, 2019 (JP) .............................. JP2019-008485

(51) Int. Cl.
*B60S 1/08* (2006.01)
*G05D 1/00* (2006.01)

(52) U.S. Cl.
CPC .......... *B60S 1/0818* (2013.01); *G05D 1/0061* (2013.01); *G05D 1/0066* (2013.01); *G05D 1/0088* (2013.01); *B60S 1/0848* (2013.01); *G05D 2201/0213* (2013.01)

(58) Field of Classification Search
CPC ... B60S 1/0818; B60S 1/0848; G05D 1/0061; G05D 1/0088
See application file for complete search history.

(56) References Cited

U.S. PATENT DOCUMENTS

| | | | |
|---|---|---|---|
| 10,061,312 B1* | 8/2018 | Anderson | G05D 1/0238 |
| 2016/0282865 A1 | 9/2016 | Shimizu et al. | |
| 2018/0290632 A1* | 10/2018 | Rice | B60S 1/56 |
| 2019/0092287 A1* | 3/2019 | Leach | B60S 1/603 |
| 2019/0369635 A1* | 12/2019 | Kobayashi | B60W 60/0059 |
| 2020/0001331 A1* | 1/2020 | Deane | B08B 3/02 |
| 2021/0039670 A1* | 2/2021 | Sakai | B60S 1/56 |

FOREIGN PATENT DOCUMENTS

JP 2016-179767 A 10/2016

* cited by examiner

*Primary Examiner* — Michael J Zanelli
(74) *Attorney, Agent, or Firm* — Dinsmore & Shohl LLP

(57) ABSTRACT

A vehicle control apparatus includes one or more electronic control units configured to execute autonomous traveling control of a vehicle based on detection results of a plurality of sensors, a cleaner configured to clean dirt off of at least one of the plurality of sensors. The one or more electronic control units are configured to determine, when cleaning of dirt of a first sensor is executed, whether or not execution of the autonomous traveling control can be continued based on a detection result of one or more remaining sensors among the plurality of sensors, control the vehicle such that a required detection range is narrowed in case it is determined that the execution of the autonomous traveling control cannot be continued, and control the cleaner such that the cleaner cleans dirt off of the first sensor while continuing the execution of the autonomous traveling control.

13 Claims, 3 Drawing Sheets

VEHICLE CONTROL APPARATUS

CROSS-REFERENCE TO RELATED APPLICATIONS

This application claims priority to Japanese Patent Application No. 2019-008485 filed on Jan. 22, 2019, which is incorporated herein by reference in its entirety including the specification, drawings and abstract.

BACKGROUND

1. Technical Field

The disclosure relates to a vehicle control apparatus.

2. Description of Related Art

In order for the apparatus to execute control of autonomous traveling, it is necessary for a detector, such as various sensors and cameras, which detects information on surroundings of the vehicle, to demonstrate a given detection performance. However, since a detector provided outside the vehicle is exposed to, for example, wind and rain, dirt is likely to adhere thereto and the detection performance may deteriorate. Further, even when the detector is provided inside the vehicle, the detection performance may deteriorate due to, for example, fog or dirt on the window glass. In response to the above issues, for example, a device that removes dirt from the detector when switching from manual driving to autonomous driving in which the control of the autonomous traveling is executed has been proposed (see Japanese Unexamined Patent Application Publication No. 2016-179767).

SUMMARY

During a period in which dirt is removed from the detector (in other words, the period in which the detector is cleaned), the information on the surroundings of the vehicle cannot be correctly detected. For this reason, when it is necessary to remove the dirt from the detector during the autonomous driving for cleaning of the detector, driving mode should be switched from the autonomous driving to manual driving. However, the convenience for the user is reduced when the driving mode is switched from the autonomous driving to the manual driving every time the detector is cleaned.

The present disclosure provides a vehicle control apparatus that can prevent control of autonomous traveling from being canceled due to cleaning of dirt of a detector.

A vehicle control apparatus according to one aspect of the present disclosure includes: a plurality of sensors, each of the plurality of sensors being configured to detect information on outside of a vehicle; a cleaner configured to clean dirt off of at least one of the plurality of sensors; and one or more electronic control units configured to: execute control of autonomous traveling that causes the vehicle to travel autonomously based on detection results of the plurality of sensors; determine, when the control of the autonomous traveling is executed and when cleaning of dirt of a first sensor is executed, whether or not execution of the control of the autonomous traveling is continuable based on a detection result of one or more remaining sensors different from the first sensor among the plurality of sensors, the first sensor being included in the at least one of the plurality of sensors; and in case of determining that the execution of the control of the autonomous traveling is not continuable based on the detection result of the one or more remaining sensors, control the vehicle such that a required detection range which is a detection range of the plurality of sensors required for execution of the control of the autonomous traveling is narrowed, and control the cleaner such that the cleaner cleans the dirt off the first sensor while continuing the execution of the control of the autonomous traveling.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
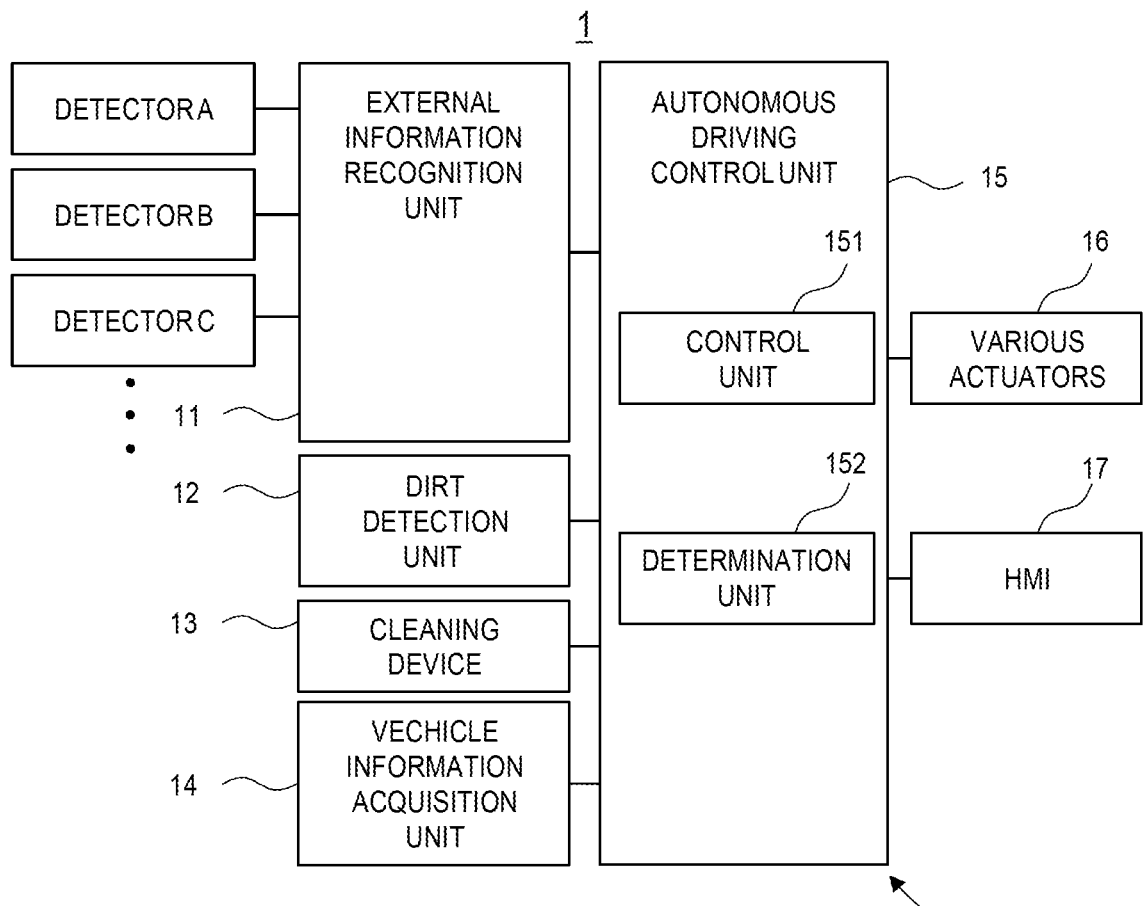
FIG. 1 is a block diagram illustrating a configuration of a vehicle control apparatus according to one embodiment.

Hereinafter, one embodiment related to a vehicle control apparatus will be described with reference to FIGS. 1 to 4.
Configuration A configuration of the vehicle control apparatus according to the embodiment will be described with reference to FIG. 1. FIG. 1 is a block diagram illustrating the configuration of the vehicle control apparatus according to the embodiment.

In FIG. 1, a vehicle control apparatus 100 is mounted on a vehicle 1. The vehicle control apparatus 100 is configured to be able to autonomously drive the vehicle 1. For autonomous driving of the vehicle 1, the vehicle control apparatus 100 includes an external information recognition unit 11, a dirt detection unit 12, a cleaning device 13, a vehicle information acquisition unit 14, an autonomous driving control unit 15, various actuators 16, and a human machine interface (HMI) 17.

The external information recognition unit 11 acquires an output of a plurality of detectors (refer to "a detector A", "a detector B", and "a detector C" in FIG. 1), for example, a millimeter-wave radar, a camera, and light detection and ranging (LiDAR), which can detect a situation outside the vehicle 1. Based on the acquired output, the external information recognition unit 11 recognizes external information indicating a situation around the vehicle 1. Moreover, since various existing aspects can be applied to the method of recognizing the external information, detailed descriptions thereof will be omitted.

The dirt detection unit 12 detects dirt that leads to performance deterioration of each of the plurality of detectors. Here, "dirt that leads to deterioration of performance of the detector" includes not only dirt on the detector itself but also dirt on a structure (for example, a cover or a window glass that protects the detector) that is separate from the detector but has a close relationship with the detector. Examples of the method of detecting dirt that leads to the deterioration of performance of the detector may include a method of detecting dirt by referring to an output of the self-diagnosis function of the detector, and a method of detecting dirt from a degree of reduction in detection accuracy associated with the detector. However, the method of detecting dirt that leads to the performance deterioration of the detector is not limited thereto, and various existing aspects can be applied. When detecting dirt that leads to the performance deterioration of the detector, the dirt detection unit 12 outputs a cleaning request signal representing a request for cleaning the detector on which dirt that leads to the performance deterioration is detected. In addition, hereinafter, "dirt that leads to the performance deterioration of the detector" is appropriately referred to as "dirt on the detector".

The cleaning device 13 is configured to be able to clean dirt off of each of the plurality of detectors. Here, "dirt on the detector" includes not only the above-mentioned "dirt that leads to the deterioration of performance of the detector", but also minor dirt that does not have a possibility of performance deterioration of the detector. Since various existing aspects can be applied to the cleaning device 13 and a method of cleaning dirt off of the detector, detailed descriptions thereof will be omitted. Further, "cleaning dirt off of the detector" means removing the din to such an extent that the detector can sufficiently fulfill its performance. In other words, "cleaning dirt off of the detector" is not limited to cleaning the detector itself. The concept of "cleaning dirt off of the detector" includes, for example, cleaning dirt off of the cover that protects the detector when the detector is attached to the outside of the vehicle, or, for example, cleaning dirt off of the window glass when the detector is attached to the inside of the vehicle. The cleaning device 13 may be, for example, a wiper provided to the window glass or the outer surface of the body of a vehicle, (n addition, the cleaning device 13 may be an ejecting device that includes a container that stores cleaning liquid and a nozzle that injects the cleaning liquid, and is configured to eject the cleaning liquid onto any one of the window glass, the outer surface of the body, the detector, and the cover that protects the detector.

The vehicle information acquisition unit 14 acquires vehicle information indicating the state of the vehicle 1 from a detector which can detect the state of the vehicle 1, such as a wheel speed sensor, an accelerator pedal sensor, a brake pedal sensor, and a steering angle sensor. Moreover, since various existing aspects can be applied to a method of acquiring the vehicle information, detailed descriptions thereof will be omitted.

The autonomous driving control unit 15 is configured to be able to execute control of autonomous traveling that causes the vehicle 1 to autonomously travel based on the external information recognized by the external information recognition unit 11 and the vehicle information acquired by the vehicle information acquisition unit 14. In order to execute the autonomous traveling control, the autonomous driving control unit 15 includes a control unit 151 and a determination unit 152 as processing blocks that are logically implemented or as processing circuits that are physically implemented therein. Each of the din detection unit 12, the vehicle information acquisition unit 14, and the autonomous driving control unit 15 may be implemented by an electronic circuit. For example, the dirt detection unit 12, the vehicle information acquisition unit 14, and the autonomous driving control unit 15 may be constituted with one or a plurality of electronic control units (ECUs).

For example, based on the external information, the autonomous driving control unit 15, i) recognizes a traveling lane on which the vehicle 1 is traveling (for example, recognizes a white line), ii) recognizes a preceding vehicle traveling ahead of the vehicle 1 on the traveling lane, and iii) detects another vehicle traveling on a lane adjacent to the traveling lane and trying to cut in front of the vehicle 1. When the preceding vehicle is recognized, the autonomous driving control unit 15 detects a distance from the vehicle 1 to the preceding vehicle, the speed of the preceding vehicle, and the like.

Further, based on the vehicle information, the autonomous driving control unit 15 controls, as part of the autonomous traveling control, for example, i) steering actuators or the like included in the various actuators 16 so as to prevent the vehicle 1 from deviating from the traveling lane, ii) at least one of throttle actuators and brake actuators included in various actuators 16 so that the vehicle 1 can travel while maintaining a target speed, and iii) at least one of the throttle actuators and the brake actuators included in the various actuators 16 so that the vehicle 1 can travel while maintaining a predetermined inter-vehicle distance and following the preceding vehicle. Here, the autonomous driving control unit 15 may notify a driver of the vehicle 1 of the state of the vehicle 1 via the HMI 17.

The determination unit 152 determines, for example, whether or not the execution of the autonomous traveling control can be continued. Details of operations of the control unit 151 and the determination unit 152 will be described below.

As described above, examples of the various actuators 16 include the throttle actuator, the brake actuator, and the steering actuator. Moreover, since various existing aspects can be applied to the various actuators 16 and the HMI 17, detailed descriptions thereof will be omitted.

Operation

Hereinafter, an operation of the vehicle control apparatus 100 will be described with reference to flowcharts in FIGS. 2 to 4. Here, in particular, the operation of the vehicle control apparatus 100 associated with the cleaning of the detector will be described. In the description below, "manual driving" means a state in which the vehicle 1 travels by an operation of the driver of the vehicle 1, and "autonomous driving" means a state in which the autonomous traveling control is executed and the vehicle 1 travels autonomously, not by the operation of the driver.

Figure 2:
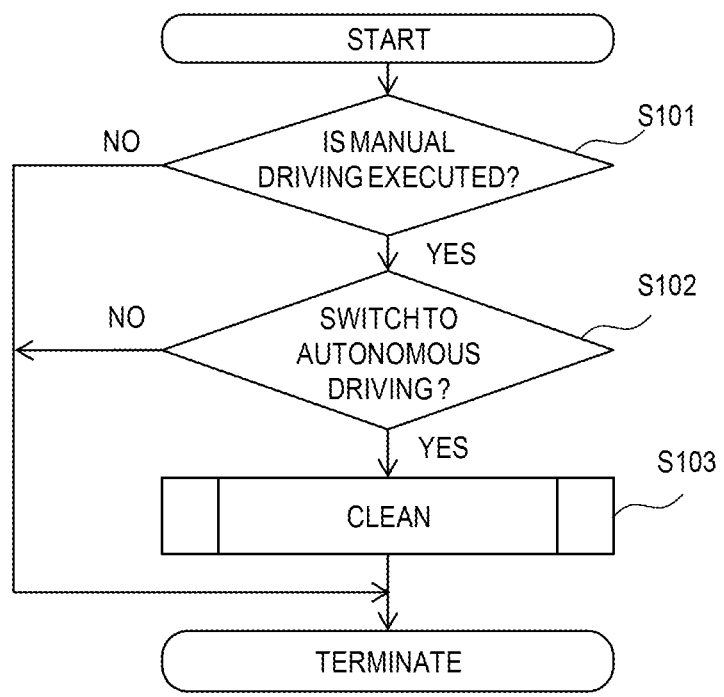
FIG. 2 is a flowchart illustrating one example of an operation of the vehicle control apparatus according to the embodiment.
Figure 3:
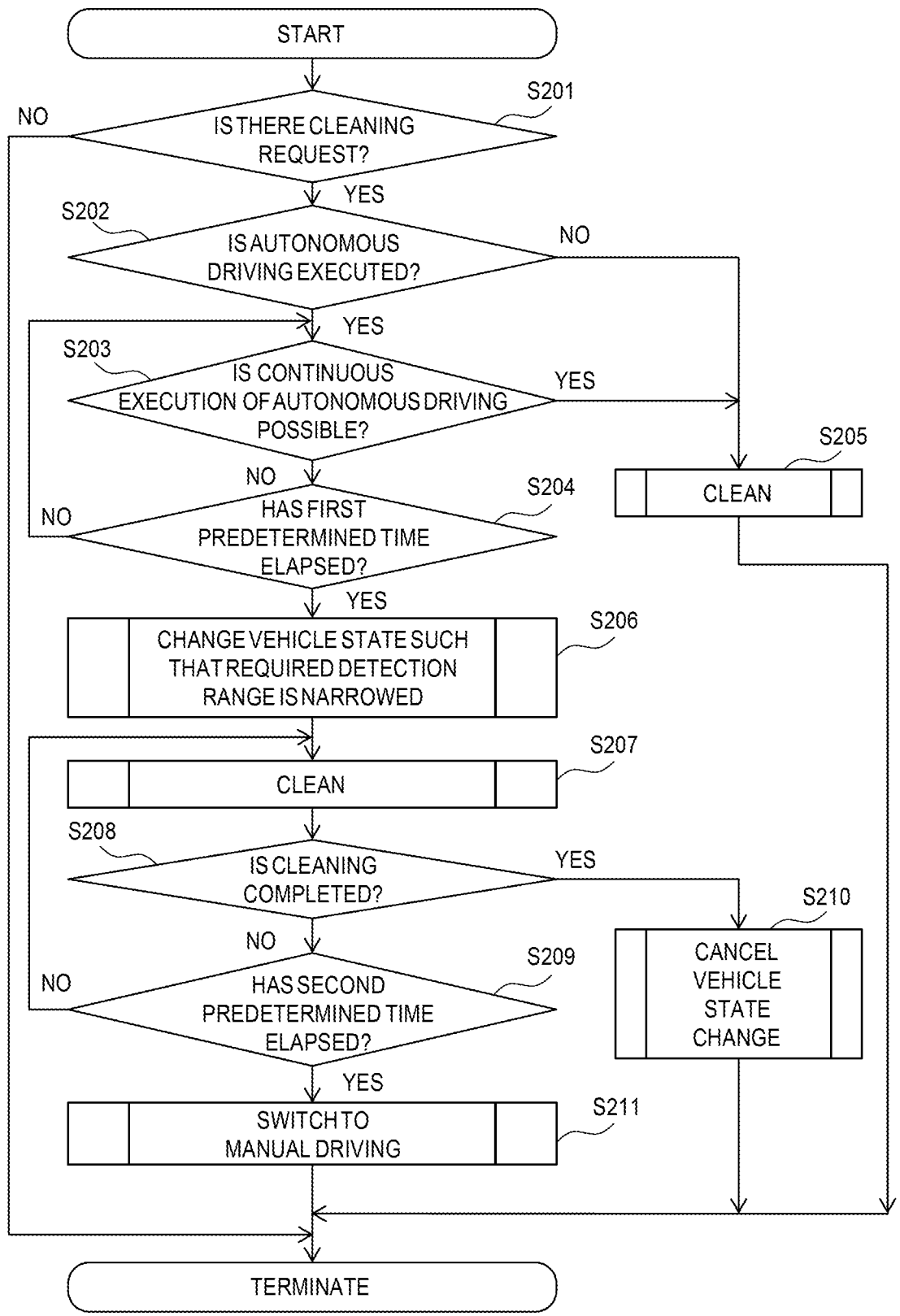
FIG. 3 is a flowchart illustrating another example of the operation of the vehicle control apparatus according to the embodiment.

In FIG. 2, the determination unit 152 of the autonomous driving control unit 15 determines whether the manual driving is executed (step S101). In processing in step S101, when the determination unit 152 determines that the manual driving is not executed (No in step S101), the operation illustrated in FIG. 2 is terminated. Thereafter, after a first predetermined period (for example, several tens of milliseconds to several hundreds of milliseconds) elapses, the processing in step S101 is executed. In other words, the operation illustrated in FIG. 2 is repeatedly executed at a cycle corresponding to the first predetermined period.

In the processing in step S101, when the determination unit 152 determines that the manual driving is executed (Yes in step S101), the determination unit 152 determines whether to switch to the autonomous driving (step S102). In addition, whether to switch to the autonomous driving is determined based on. For example, a detection result, such as a state of a specific button associated with the autonomous driving. In processing in step S102, when the determination unit 152 determines not to switch to the autonomous driving (No in step S102), the operation illustrated in FIG. 2 is terminated. Thereafter, after the first predetermined period elapses, the processing in step S101 is executed.

In the processing in step S102, when the determination unit 152 determines to switch to the manual driving (Yes in step S102), die control unit 151 of the autonomous driving control unit 15 controls the cleaning device 13 such that the cleaning device 13 cleans dirt off of each of the plurality of detectors (step S103). Processing in step S103 is typically executed when the dirt detection unit 12 outputs a cleaning request signal. However, the processing in step S103 may also be executed when the dirt detection unit 12 does not output the cleaning request signal.

When driving mode is switched from the manual driving to the autonomous driving as a result of executing the operation illustrated in FIG. 2, dirt is cleaned off of all of the plurality of detectors by the cleaning device 13.

Next, the operation of the vehicle control apparatus 100, mainly during the autonomous driving, will be described with reference to the flowchart in FIG. 3. In FIG. 3, the determination unit 152 of the autonomous driving control unit 15 determines whether there is a request for cleaning at least one of the plurality of detectors (step S201). Whether there is a request for cleaning the detector is determined based on whether there is a cleaning request signal from the dirt detection unit 12. In processing in step S201, when the determination unit 152 determines that there is no request for cleaning the detector (No in step S201), the operation illustrated in FIG. 3 is terminated. Thereafter, after a second predetermined period (for example, several tens of milliseconds to several hundreds of milliseconds) elapses, the processing in step S201 is executed. In other words, the operation illustrated in FIG. 3 is repeatedly executed at a cycle corresponding to the second predetermined period.

In the processing in step S201, when the determination unit 152 determines that there is a request for cleaning at least one detector (Yes in step S201), the determination unit 152 determines whether the autonomous driving is executed (step S202). In processing in step S202, when the determination unit 152 determines that the autonomous driving is not executed, that is, the manual driving is executed (No in step S202), the control unit 151 of the autonomous driving control unit 15 controls the cleaning device 13 such that the cleaning device 13 cleans dirt off of a detector represented by the cleaning request signal, that is, a detector on which dirt is detected (step S205).

In the processing in step S202, when the determination unit 152 determines that the autonomous driving is executed (Yes in step S202), the determination unit 152 determines whether the autonomous driving can be continued (step S203). Specifically, the determination unit 152 determines whether the autonomous driving can be continued based on a detection result of another detector different from the detector on which dirt is detected among the plurality of detectors.

The status where the autonomous driving can be continued based on the detection result of another detector, includes i) a status where one function using the detection result of the detector on which dirt is detected can be replaced with another function using a detection result of another detector, that is, functionally replaceable, and ii) a status where the detection target of the detector on which dirt is detected can be detected by another detector. The status where the autonomous driving can be continued based on the detection result of another detector may further include a status where a movement in the near future (for example, several seconds to several tens of seconds) of the detection target of the detector on which dirt is detected can be estimated from the detection result of another detector. In this status, the detection result of the detector on which dirt is detected may be used in addition to the detection result of another detecto.

Here, the processing in step S203 will be further described with reference to the flowchart in FIG. 4.

Figure 4:
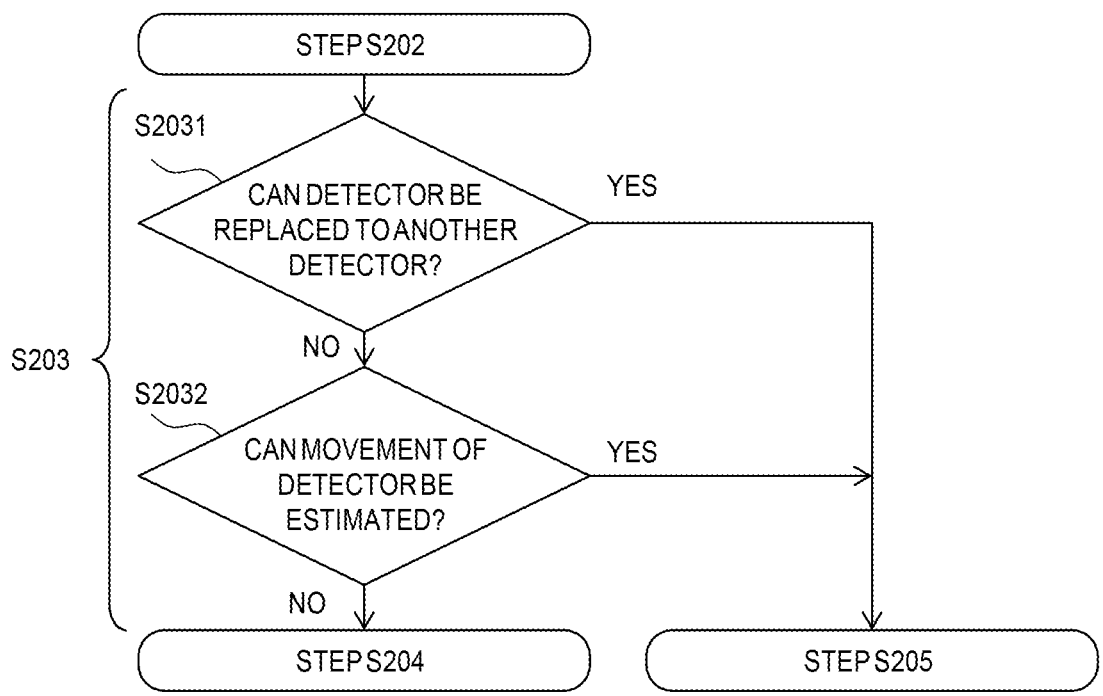
FIG. 4 is a flowchart illustrating a detailed example of processing in step S203 illustrated in FIG. 3.

In FIG. 4, the determination unit 152 determines whether the detector on which dirt is detected can be replaced with another detector, as part of the processing in step S203 (step S2031). The status where "the detector on which din is detected can be replaced with another detector" includes i) a status where a determination based on the detection result of the detector on which dirt is detected can be replaced with a determination based on a detection result of another detector on the detection target of the detector on which dirt is detected, and ii) a status where the detection target of the detector on which dirt is detected can be detected by another detector with the same accuracy as that of the detector on which dirt is detected.

In processing in step S2031, when determination unit 152 determines that the detector on which dirt is detected cannot be replaced by another detector (No in step S2031), the determination unit 152 determines, as another part of the processing in step S203, whether the movement in the near future of the detection target of the detector on which dirt is detected can be estimated from the detection result of another detector (step S2032).

When the determination unit 152 determines in the processing in step S2031 that the detector on which dirt is detected can be replaced by another detector (Yes in step S2031), or when determination unit 152 determines in processing in step S2032 that the movement in the near future of the detection target of the detector on which dirt is detected can be estimated from the detection result of another detector (Yes in step S2032), the determination unit 152 determines that the autonomous driving can be continued (Yes in step S203). In this status, the control unit 151 controls the cleaning device 13 such that the cleaning device 13 cleans dirt off of the detector represented by the cleaning request signal, that is, the detector on which dirt is detected while continuing the autonomous driving, that is, continuing the execution of the autonomous traveling control (step S205).

In the processing in step S2032, when the determination unit 152 determines that the movement in the near future of the detection target of the detector on which dirt is detected cannot be estimated from the detection result of another detector (No step S2032), the determination unit 152 determines whether the first predetermined time has elapsed without the cleaning of the detector on which dirt is detected (step S204) after the determination unit 152 determines in the processing in step S201 that there is a request for cleaning the detector (or after the cleaning request signal is output).

In processing step S204, when the determination unit 152 determines that the first predetermined time has not elapsed (No in step S204), the processing in step S203 is executed again. On the other hand, in die processing in step S204, when the determination unit 152 determines that the first predetermined time has elapsed (Yes in step S204), the determination unit. 152 determines that the autonomous driving cannot be continued. Here, during traveling of the vehicle 1, the situation around the vehicle 1 changes every moment. Thus, even when the determination unit 152 determines that the autonomous driving cannot be continued at one time point, there is a possibility that the determination unit 152 determines that the autonomous driving can be continued a short time later. Therefore, in the present embodiment, the determination unit determines for the first time that "the autonomous driving cannot be continued" only when the processing in step S203 branches to "No", and then the determination unit 152 determines in the processing in step S204 that the first predetermined time has elapsed.

The "first predetermined time" is a value determining whether the autonomous driving cannot be continued, and is set in advance as a fixed value, or a variable value according to a certain parameter or physical quantity. The "first predetermined time" is determined experimentally, empirically, or by simulation, for example, by obtaining a period when the amount of the change in a move of the vehicle 1 is within an allowable range from a change over time in the move of the vehicle 1 traveling by the autonomous traveling control after dirt on the detector is detected, and setting the maximum value of the obtained period as the first predetermined time.

Next, the control unit 151 changes the state of the vehicle 1 such that the required detection range is narrowed. The required detection range is required for the execution of the autonomous traveling control (step S206). Here, the execution of the autonomous traveling control (that is, autonomous driving) is continued. In other words, in this embodiment, even when the determination unit 152 determines that the autonomous driving cannot be continued, the autonomous driving is not canceled immediately. Here, the "required detection range" is represented by a distance from the vehicle 1, having a variable, such as an operation associated with the autonomous traveling control (for example, a lane change and an emergency stop), kinds of traveling paths (for example, a highway and a local road), road surface conditions, and a braking distance.

The required detection range changes depending on the situation around the vehicle 1. In principle, the required detection range gets narrower when the speed of the vehicle 1 is relatively low than when the speed is relatively high. This is because when die speed of the vehicle 1 is relatively low, a distance that the vehicle 1 moves per unit time is shorter than when the speed is relatively high, and accordingly the range to be recognized in order to execute the autonomous traveling control gets narrower. Further, when the speed of the vehicle 1 is relatively low, the stopping distance of the vehicle 1 gets shorter than when the speed is relatively high, and accordingly the vehicle 1 can be prevented from colliding with an obstacle even when the obstacle is detected at a position relatively close to the vehicle 1.

Therefore, "changing the state of the vehicle 1 such that the required detection range can be narrowed" means changing the state of the vehicle 1 such that the moving distance per unit time of the vehicle 1 is shortened and/or the stopping distance of the vehicle 1 can be shortened. Specifically, the control unit 151 executes, for example, at least one of i) increasing the brake hydraulic pressure of the vehicle 1, ii) reducing the target speed associated with the autonomous traveling control, and iii) changing a parameter associated with a brake system (not shown) of the vehicle 1, such that the required detection range is narrowed. Moreover, "increasing the brake hydraulic pressure" means increasing the hydraulic pressure associated with the brake system of the vehicle 1 without generating the braking force.

After processing in step S206, the control unit 151 controls the cleaning device 13 such that the cleaning device 13 cleans dirt off of the detector represented by the cleaning request signal, that is, the detector on which dirt is detected while continuing the autonomous driving, that is, continuing the execution of the autonomous traveling control (step S207). Next, the determination unit 152 determines whether the cleaning of the detector on which dirt is detected is completed (step S208).

Here, the determination unit 152 determines that the cleaning is completed when, for example, i) a third predetermined time has elapsed since the cleaning of the detector on which dirt is detected is started (for reference, the third predetermined time is shorter than a second predetermined time to be described below) or ii) the cleaning request signal is not output from the dirt detection unit 12 (specifically, for example, when there is an output indicating that the detector is not dirty by a self-diagnosis function of the detector on which dirt is detected, or when the detection accuracy associated with the detector on which dirt is detected meets a predetermined detection accuracy). Further, the method of determining whether the cleaning is completed is not limited thereto, and various existing aspects can be applied thereto.

In processing in step S208, when the determination unit 152 determines that the cleaning is completed (Yes in step S208), the control unit 151 returns the state of the vehicle 1, which has been changed in the processing in step S206, to the original state (that is, cancels the state change of the vehicle 1), and continues the autonomous driving (step S210).

In the processing in step S208, when the determination unit 152 determines that the cleaning is not completed (No in step S208), the determination unit 152 determines whether the second predetermined time has elapsed since the cleaning of the detector on which dirt is detected is started (step S209). In processing in step S209, when the determination unit 152 determines that the second predetermined time has not elapsed (No in step S209), the processing in step S207 is executed again (that is, the cleaning is continued).

In the processing in step S209, when the determination unit 152 determines that the second predetermined time has elapsed (Yes in step S209), the control unit 151 cancels the autonomous traveling control (that is, cancels the autonomous driving), and switches to the manual driving (step S211). Here, the control unit 151 may notify, via the HMI 17, the driver of the vehicle 1 that the autonomous driving is canceled.

The "second predetermined time" is a value determining whether to cancel the execution of the autonomous traveling control, and is set in advance as a fixed value, or a variable value according to a certain parameter or physical quantity. The "second predetermined time" is determined experimentally, empirically, or by simulation, for example, by obtaining a period when the amount of the change in a move of the vehicle 1 is within an allowable range from a change over time in the move of the vehicle 1 traveling by the autonomous traveling control after the cleaning of the detector (on which dirt is detected) is started, and setting the maximum value of the obtained period as the second predetermined time.

Effect

Even when the determination unit 152 determines that the autonomous driving cannot be continued, the vehicle control apparatus 100 can clean the dirt off of the detector on which dirt is detected while continuing the execution of the autonomous traveling control by changing the state of the vehicle 1 (or controlling the vehicle 1) so that the required detection range can be narrowed. Therefore, with the vehicle control apparatus 100, the autonomous traveling control can be prevented from being canceled due to the cleaning of dirt of the detector.

Modifications (1) Instead of the processing in step S204 according to the above embodiment, as part of the processing in step S203, the following processing may be executed as follows: i) processing of determining whether it is expected that one function using the detection result of the detector on which dirt is detected can be replaced with another function using a detection result of another detector within the first predetermined time, and/or ii) processing of determining whether it is expected that the detection target of the detector on which dirt is detected can be detected by another detector within the first predetermined time.

When it is expected that one function using the detection result of the detector on which dirt is detected can be replaced with another function using a detection result of another detector within the first predetermined time, and/or when it is expected that the detection target of the detector on which dirt is detected can be detected by another detector within the first predetermined time, the determination unit 152 determines that the autonomous driving can be continued (Yes in step S203), and then the cleaner cleans the dirt off of the detector on which dirt is detected (step S205).

(2) As part of the processing in step S203, processing of determining whether the vehicle 1 arrives at a destination within a fourth predetermined time shorter than the first predetermined time may be executed. Then, when the determination unit 152 determines that the vehicle 1 arrives at the destination within the fourth predetermined time, the autonomous driving is continued, and the dirt on the detector on which dirt is detected may be cleaned off when the vehicle 1 starts decelerating.

(3) When a rain sensor is provided in the vehicle 1 and the determination unit 152 determines that it is raining based on an output of the rain sensor, processing of determining whether or not the fifth predetermined time has elapsed after a cleaning request signal is output may be executed, for example, before the processing in step S203. When the determination unit 152 determines that the fifth predetermined time has not elapsed, the processing in step S201 may be executed again, and when the determination unit 152 determines that the fifth predetermined time has elapsed, the processing in step S203 may be executed. With the above configuration, the detector on which dirt is detected does not have to output a cleaning request signal since dirt is cleaned off of the detector by the rain.

Various aspects of the disclosure derived from the embodiment and modifications described above will be described below.

A vehicle control apparatus according to one aspect of the disclosure includes a plurality of detectors, each of which detects information associated with the outside of a vehicle, a controller that can execute the autonomous traveling control that causes the vehicle to travel autonomously based on a detection result of the plurality of detectors, a cleaner that can clean dirt off of each of the plurality of detectors, and a determination unit 152 determines, when the autonomous traveling control is executed and when dirt on a detector of the plurality of detectors needs to be cleaned off whether or not the execution of the autonomous traveling control can be continued based on a detection result of another detector different from the detector of the plurality of detectors. In case the determination unit 152 determines that the execution of the autonomous traveling control cannot be continued based on the detection result of the another detector, the controller controls the vehicle such that the required detection range, which is the detection range of the detector required for execution of the autonomous traveling control is narrowed, and controls the cleaner such that the cleaner cleans dirt off of the one detector while continuing the execution of the autonomous traveling control.

In the above embodiment, the "cleaning device 13" is an example of the "cleaner", the "control unit 151", is an example of the "controller", and the "determination unit 152" is an example of the "determination tool". In addition, the "detector on which dirt is detected" in the embodiment is an example of "one detector".

As a detector, various existing detectors can be applied as long as they can detect information associated with the outside of the vehicle. Here, the information associated with the outside of the vehicle is information required for the execution of the autonomous traveling control, and examples thereof may include information associated with an obstacle, a white line, and a road sign. The plurality of detectors do not need to be different from one another, and some of them may be of the same kind. Moreover, the detection ranges of each of the plurality of detectors may or may not overlap one another.

The controller is configured to be able to execute the autonomous traveling control based on the detection results of the plurality of detectors. When the autonomous traveling control is executed, the detection results of all of the plurality of detectors do not have to be used. In other words, the autonomous traveling control may be executed based on the detection results of some of the plurality of detectors. Moreover, since various existing aspects can be applied to the autonomous traveling control, detailed descriptions thereof will be omitted.

The cleaner is configured to be able to clean dirt off of each of the plurality of detectors. Here, "cleaning dirt off" means removing din to such an extent that the detector can sufficiently demonstrate its performance. In other words, "cleaning dirt off of the detector" is not limited to cleaning the detector itself. When the detector is attached to the outside of the vehicle, for example, cleaning dirt off of the cover that protects the detector corresponds to cleaning dirt off of the detector. Further, when the detector is attached to the inside of the vehicle, for example, cleaning dirt off of the window glass which is a boundary between the outside and the inside of the vehicle corresponds to cleaning dirt off of the detector. Moreover, since various existing aspects can be applied to the cleaner, detailed descriptions thereof will be omitted.

When the autonomous traveling control is executed, when dirt on one of the plurality of detectors needs to be cleaned off, the determination unit 152 determines whether the execution of the autonomous traveling control can be continued based on a detection result of another detector.

When the determination unit 152 determines that the execution of the autonomous traveling control cannot be continued based on the detection result of another defector, the controller controls the vehicle such that the required detection range is narrowed, and then controls the cleaner such that the cleaner cleans dirt off of one detector while continuing the execution of the autonomous traveling control.

The required detection range changes depending on a traveling environment of the vehicle. In principle, the required detection range gets narrower when the speed of the vehicle is relatively low than when the speed is relatively high. This is because when the speed of the vehicle is relatively low, a distance that the vehicle moves per unit time is shorter than when the speed is relatively high. Further, this is because when the speed of the vehicle is relatively low, the stopping distance of the vehicle gets shorter than when the speed is relatively high.

Therefore, "controlling the vehicle such that the required detection range is narrowed" means controlling the vehicle such that the moving distance per unit time of the vehicle is shortened and/or the stopping distance of the vehicle can be shortened.

It has been found by research of the present inventors that even when the determination unit 152 determines that the execution of the autonomous traveling control cannot be continued based on the detection result of the another detector, the execution of the autonomous traveling control can be continued in a safe manner if the required detection range gets narrower than the time point of the determination. For this reason, in the vehicle control apparatus, as described above, dirt is cleaned off of one detector while the execution of the autonomous traveling control is continued after the vehicle is controlled such that the required detection range is narrowed. In addition, how much the required detection range is narrowed may be appropriately set. For example, the required detection range may be narrowed to a range where the execution of the autonomous traveling control can be continued based on the defection result of another detector. With the above configuration, the execution of autonomous traveling control can be continued in a safe manner. Even when the detection result of another detector cannot be used if the required detection range is narrowed, the execution of autonomous traveling control can be continued in a safe manner if a change in the environment around the vehicle 1 can be expected during the period when dirt is cleaned off of one detector.

In the vehicle control apparatus 100, even when the determination unit 152 determines that the execution of the autonomous traveling control cannot be continued based on the detection result of another detector, dirt on one detector on which dirt is detected can be cleaned off while continuing the execution of the autonomous traveling control by controlling the vehicle such that the required detection range is narrowed. In other words, even when the determination unit 152 determines that the execution of the autonomous traveling control cannot be continued based on the detection result of another detector if the required detection range is maintained, as a result of controlling the vehicle such that the required detection range is narrowed, dirt on one detector on which dirt is detected can be cleaned off while continuing the execution of the autonomous traveling control. Therefore, with the vehicle control apparatus, the autonomous traveling control can be prevented from being canceled due to the cleaning of the detector.

Moreover, when the determination unit 152 determines that the execution of the autonomous traveling control can be continued based on the detection result of the another detector, the controller typically controls the cleaner such that the cleaner cleans dirt off of one detector while continuing the execution of the autonomous traveling control.

In one aspect of the vehicle control apparatus, in case the determination unit 152 determines that the execution of the autonomous traveling control cannot be continued based on the detection result of another detector, the controller increases the brake hydraulic pressure of the vehicle such that the required detection range is narrowed. Here, "increasing the brake hydraulic pressure" means increasing the hydraulic pressure associated with the brake system of the vehicle without generating the braking force, and specifically, one example thereof may be increasing the hydraulic pressure of the master cylinder.

With the above configuration, when stopping or decelerating the vehicle, the period from the time when an operation of the brake system is started to the time when the braking force is generated can be shortened. As such, a free running distance of the vehicle can be shortened, and as a result, the stopping distance of the vehicle can be shortened. Therefore, according to the present embodiment, the required detection range can be narrowed relatively easily.

According to another embodiment of the vehicle control apparatus, in case the determination unit 152 determines that the execution of the autonomous traveling control cannot be continued based on the detection result of another detector, the controller reduces a target speed associated with the autonomous traveling control such that the inquired detection range is narrowed. With the above configuration, the moving distance per unit time of the vehicle can be shortened. Therefore, according to the present embodiment, the required detection range can be narrowed relatively easily.

According to another embodiment of the vehicle control apparatus, in case the determination unit 152 determines that the execution of the autonomous traveling control cannot be continued based on the detection result of another detector, the controller changes the parameter associated with the brake system of the vehicle such that the required detection range is narrowed.

In the brake system, parameters that define its operation are set. "Changing the parameter associated with the brake system such that the required detection range is narrowed" means changing the parameter so that the period from the time when an operation of the brake system is started to the time when the braking force is generated can be shortened when stopping or decelerating the vehicle.

With the above configuration, the free running distance of the vehicle can be shortened, and as a result, the stopping distance of the vehicle can be shortened. Therefore, according to the present embodiment, the required detection range can be narrowed relatively easily.

According to another embodiment of the vehicle control apparatus, the vehicle control apparatus includes a dirt detector that detects dirt on each of the plurality of detectors, and outputs a request for cleaning. In case the first predetermined time elapses without cleaning dirt off of one detector since the dirt detector outputs the request for cleaning the detector, the determination unit 152 determines that execution of the autonomous traveling control cannot be continued based on the detection result of another detector.

Since various existing aspects can be applied to the dirt detector, detailed description thereof will be omitted. In case dirt is detected on one detector, the dirt detector may output a request for cleaning the detector. Alternatively, after dirt is detected on the detector, in case detection accuracy associated with one detector is less than detection accuracy required of the detector, a request for cleaning the detector may be output. The "dirt detection unit 12" in the above-described embodiment is an example of the "dirt detector".

When a state in which there is a request for cleaning one detector (that is, one detector is dirty) is continued, there is a high possibility that the state will affect the autonomous traveling control. However, even when one detector is dirty, it does not mean that the execution of the autonomous traveling control immediately cannot be continued. In addition, the situation around the vehicle changes every moment during traveling of the vehicle. Thus, even when the execution of the autonomous traveling control cannot be continued based on the detection result of another detector at one time point after the request for cleaning the detector is output, there is a possibility that the execution of the autonomous traveling control can be continued based on the detection result of another detector a short time later.

As described above, in the vehicle control apparatus, in case the first predetermined time elapses without cleaning dirt off of one detector since the dirt detector outputs the request for cleaning the detector, the determination unit 152 determines that execution of the autonomous traveling control cannot be continued based on the detection result of another detector. With the above configuration, the autonomous traveling control can be prevented from being affected by the state in which one detector is dirty while the autonomous traveling control is prevented from being canceled.

The "first predetermined time" is a value determining whether the execution of the autonomous traveling control cannot be continued based on the detection result of another detector, and is set in advance as a fixed value, or a variable value according to a certain parameter or physical quantity. The "first predetermined time" is determined experimentally, empirically, or by simulation, for example, by obtaining a period when the amount of the change in a move of the vehicle 1 is within an allowable range from a change over time in the move of the vehicle 1 traveling by the autonomous traveling control after the request for cleaning one detector is output, and setting the maximum value of the obtained period as the first predetermined time. Moreover, the "first predetermined time" may change depending on, for example, the degree of dirtiness of one detector.

According to another embodiment of the vehicle control apparatus, when the determination unit 152 determines that execution of the autonomous traveling control cannot be continued based on the detection result of another detector, and when the controller controls the cleaner such that the cleaner cleans dirt off of one detector while continuing the execution of the autonomous traveling control, the controller cancels the execution of the autonomous traveling control in case the time for cleaning the detector exceeds a second predetermined time.

While one detector is cleaned, it becomes difficult to detect information associated with the outside of the vehicle by the detector (even when detection is possible, a possibility of meeting the detection accuracy required of the detector is extremely low). Here, the time for cleaning the detector often varies depending on the degree dirtiness of the detector.

As described above, in the vehicle control apparatus, when the determination unit 152 determines that die execution of the autonomous traveling control cannot be continued based on the detection result of another detector, the controller controls the vehicle such that the required detection range is narrowed, and controls the cleaner such that the cleaner cleans dirt off of one detector while continuing the execution of the autonomous traveling control. However, even when the measure of narrowing the required detection range is taken, a state may not be continued in which it is difficult for the detector to detect the information associated with the outside of the vehicle due to cleaning of the detector.

Therefore, in the vehicle control apparatus, the controller cancels the execution of the autonomous traveling control in case the time for cleaning the detector exceeds a second predetermined time. With the above configuration, the safety of the vehicle can be secured.

"The second predetermined time" is a value determining whether to cancel the execution of the autonomous traveling control, and is set in advance as a fixed value, or a variable value according to a certain parameter or physical quantity. The "second predetermined time" is determined experimentally, empirically, or by simulation, for example, by obtaining a period when the amount of the change in a move of the vehicle 1 is within an allowable range from a change over time in a move of the vehicle 1 traveling by the autonomous traveling control after the cleaning of one detector is started, and setting the maximum value of the obtained period as the second predetermined time.

According to another embodiment of the vehicle control apparatus, in case the execution of the autonomous traveling control can be continued based on a detection result of another detector, the controller controls the cleaner such that the cleaner cleans dirt off of one detector while continuing the execution of the autonomous traveling control. With the above configuration, dirt on the detector can be cleaned off while the execution of the autonomous traveling control is appropriately continued. In other words, it is possible to clean dirt off of the detector while the execution of the autonomous traveling control is continued without controlling the vehicle such that the required detection range is narrowed as in the case where the execution of the autonomous traveling control cannot be continued based on the detection result of another detector.

Here, when a determination based on the detection result of one detector can be replaced with a determination based on the detection result of another detector on the detection target of the detector, the determination unit 152 determines that the execution of the autonomous traveling control can be continued based on a detection result of another detector.

Alternatively, when the detection target of one detector can be detected by another detector with the same accuracy as that of the detector, the determination unit 152 determines that the execution of the autonomous traveling control can be continued based on a detection result of another detector.

Alternatively, when the movement of the detection target of one detector can be estimated from the detection result of another detector, the determination unit 152 determines that the execution of the autonomous traveling control can be continued based on a detection result of another detector.

According to another embodiment of the vehicle control apparatus, when the driving mode of the vehicle is switched from manual driving mode in which the vehicle travels by an operation of the driver of the vehicle to autonomous driving mode in which the vehicle travels by the execution of the autonomous traveling control, the controller controls the cleaner such that the cleaner cleans dirt off of at least one of the plurality of detectors. With the above configuration, an occurrence of a situation can be prevented where the detector needs to be cleaned while the autonomous traveling control is executed.

The present disclosure is not limited to the above embodiment, and can be appropriately modified within a range not departing from the scope or the summary of the disclosure that can be understood from the claims and the entire specification. In addition, the vehicle control apparatus according to such modifications is also included in the technical scope of the present disclosure.

What is claimed is:
1. A vehicle control apparatus comprising:
 a plurality of sensors, each of the plurality of sensors being configured to detect information on outside of a vehicle;
 a cleaner configured to clean dirt off of at least one of the plurality of sensors; and
 one or more electronic control units configured to
  execute control of autonomous traveling that causes the vehicle to travel autonomously based on detection results of the plurality of sensors, determine, when the control of the autonomous traveling is executed and when cleaning of dirt off a first sensor is executed, whether or not execution of the control of the autonomous traveling is continuable based on a detection result of one or more remaining sensors different from the first sensor among the plurality of sensors, the first sensor being included in the at least one of the plurality of sensors, and in case of determining that the execution of the control of the autonomous traveling is not continuable based on the detection result of the one or more remaining sensors, control the vehicle such that a required detection range which is a detection range of the plurality of sensors required for execution of the control of the autonomous traveling is narrowed, and control the cleaner such that the cleaner cleans the dirt off the first sensor while continuing the execution of the control of the autonomous traveling.

2. The vehicle control apparatus according to claim 1, wherein
the one or more electronic control units are configured to, in case of determining that the execution of the control of the autonomous traveling is not continuable based on the detection result of the one or more remaining sensors, increase brake hydraulic pressure of the vehicle such that the required detection range is narrowed.

3. The vehicle control apparatus according to claim 1, wherein
the one or more electronic control units are configured to, in case of determining that the execution of the control of the autonomous traveling is not continuable based on the detection result of the one or more remaining sensors, reduce a target speed in the control of the autonomous traveling such that the required detection range is narrowed.

4. The vehicle control apparatus according to claim 1, wherein
the one or more electronic control units are configured to, in case of determining that the execution of the control of the autonomous traveling is not continuable based on the detection result of the one or more remaining sensors, change a parameter associated with a brake system of the vehicle such that the required detection range is narrowed.

5. The vehicle control apparatus according to claim 1, wherein
the one or more electronic control units are configured to;
detect the dirt on the first sensor and output a request for cleaning the first sensor,
in case a first predetermined time elapses without cleaning of the first sensor after the request for cleaning the first sensor is output, determine that the execution of the control of the autonomous traveling is not continuable based on the detection result of the one or more remaining sensors.

6. The vehicle control apparatus according to claim 5, wherein
the one or more electronic control units are configured to detect the dirt on the first sensor based on at least one of output of a self-diagnosis function of the first sensor and accuracy of a detection result of the first sensor.

7. The vehicle control apparatus according to claim 1, wherein
the one or more electronic control units are configured to, when determining that the execution of the control of the autonomous traveling is not continuable based on the detection result of the one or more remaining sensors, and when controlling the cleaner such that the cleaner cleans the dirt off the first sensor while continuing the execution of the control of the autonomous traveling, cancel the execution of the control of the autonomous traveling in case a cleaning time of the first sensor exceeds a second predetermined time.

8. The vehicle control apparatus according to claim 1, wherein
the one or more electronic control units are configured to, in case of determining that the execution of the control of the autonomous traveling is continuable based on the detection result of the one or more remaining sensors, control the cleaner such that the cleaner cleans the dirt off the first sensor while continuing the execution of the control of the autonomous traveling.

9. The vehicle control apparatus according to claim 1, wherein
the one or more electronic control units are configured to, when an operation based on a detection result of the first sensor to execute the control of the autonomous traveling is replaceable by using a detection result of the one or more sensors on a detection target of the first sensor, determine that the execution of the control of the autonomous traveling is continuable based on the detection result of the one or more remaining sensors.

10. The vehicle control apparatus according to claim 1, wherein
the one or more electronic control units are configured to, when a detection target of the first sensor is detectable by the one or more remaining sensors with the same accuracy as accuracy of the first sensor, determine that the execution of the control of the autonomous travel is continuable based on the detection result of the one or more remaining sensors.

11. The vehicle control apparatus according to claim 1, wherein
the one or more electronic control units are configured to, when a movement of a detection target of the first sensor is estimatable from the detection result of the one or more remaining sensors, determine that the execution of the control of the autonomous traveling is continuable based on the detection result of the one or more remaining sensors.

12. The vehicle control apparatus according to claim 1, wherein
the one or more electronic control units are configured to, when driving mode of the vehicle is switched from manual driving mode in which the vehicle travels by an operation of a driver of the vehicle to autonomous driving mode in which the vehicle travels by the execution of the control of the autonomous traveling, control the cleaner such that the cleaner cleans the dirt off at least one of the plurality of sensors.

13. The vehicle control apparatus according to claim 1, wherein
the cleaner is configured to clean the dirt off each of the plurality of sensors.

* * * * *